Figure 6:
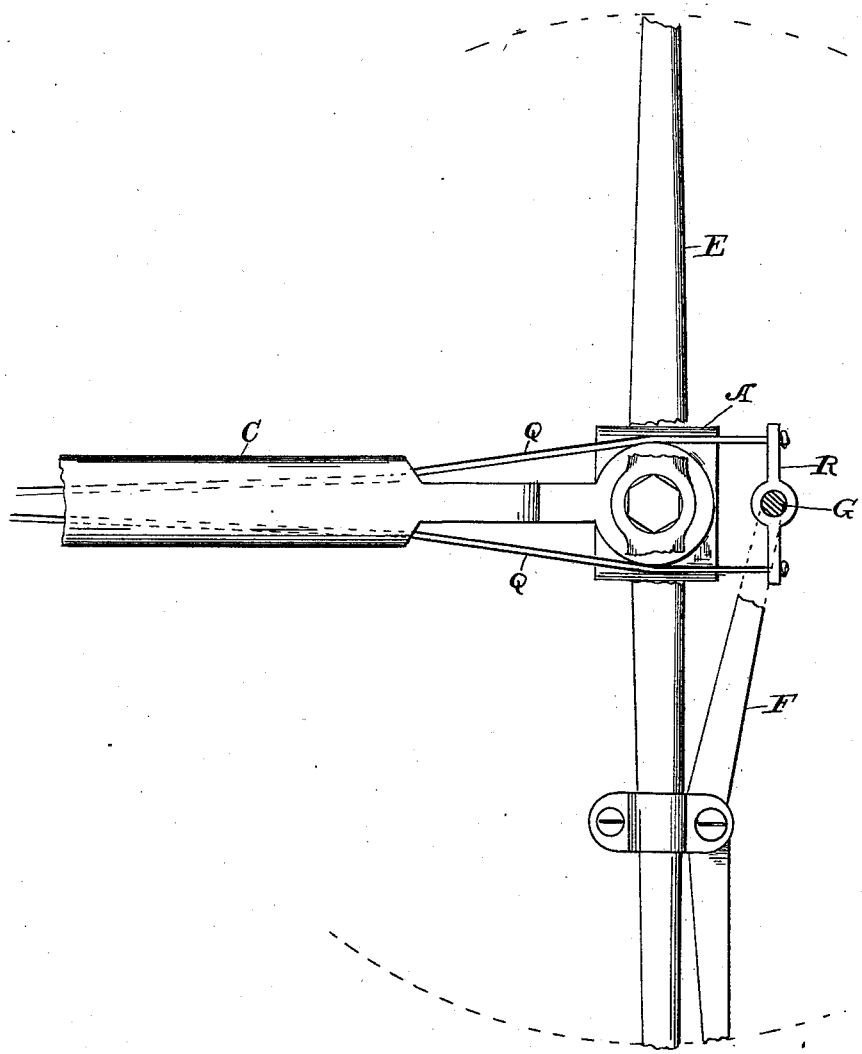

(No Model.) 2 Sheets—Sheet 1.
W. L. HAZEN & G. H. HILDRETH.
BICYCLE BRAKE.
No. 359,536. Patented Mar. 15, 1887.
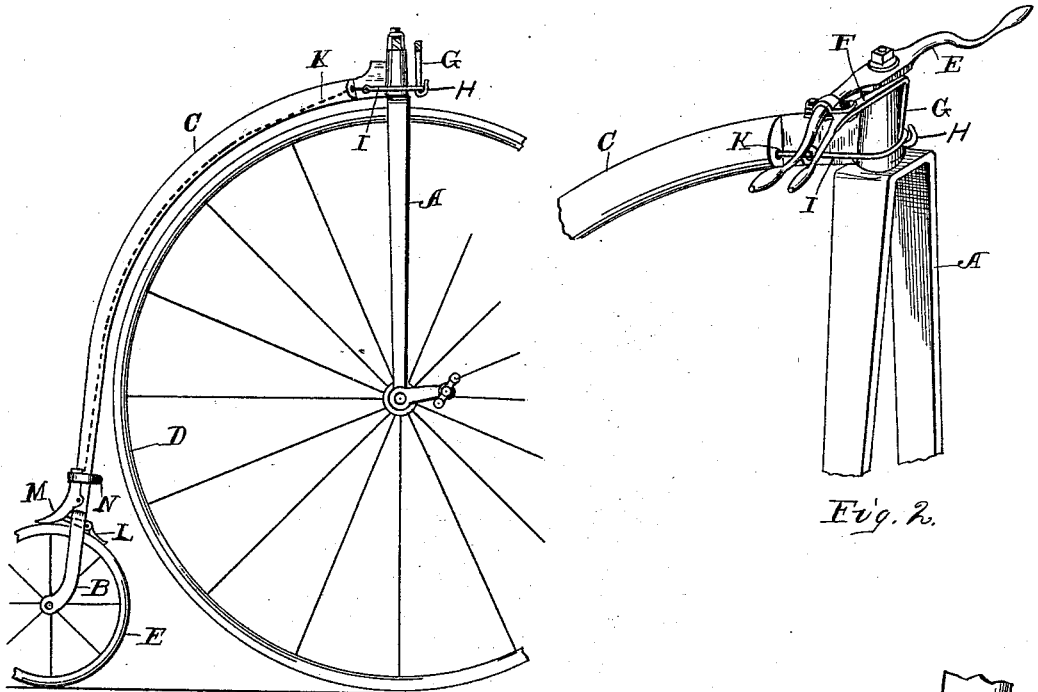
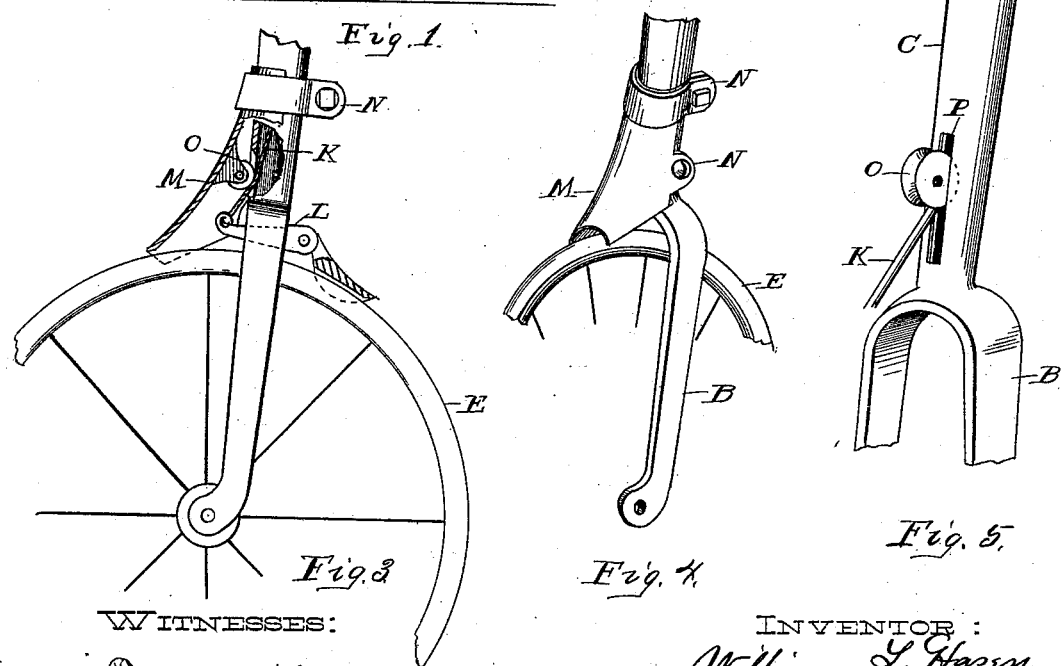

(No Model.) 2 Sheets—Sheet 2.

W. L. HAZEN & G. H. HILDRETH.
BICYCLE BRAKE.

No. 359,536. Patented Mar. 15, 1887.

UNITED STATES PATENT OFFICE.

WILLIAM L. HAZEN, OF NEWPORT, KENTUCKY, AND GEORGE H. HILDRETH, OF CINCINNATI, OHIO.

BICYCLE-BRAKE.

SPECIFICATION forming part of Letters Patent No. 359,536, dated March 15, 1887.

Application filed December 24, 1886. Serial No. 222,440. (No model.)

*To all whom it may concern:*

Be it known that we, WILLIAM L. HAZEN, of Newport, in the county of Campbell and State of Kentucky, and GEORGE H. HILDRETH, of Cincinnati, in the county of Hamilton and State of Ohio, have invented a new and useful Improvement in Bicycle-Brakes, which improvement is fully set forth in the following specification and accompanying drawings, in which—

Figure 1 is a side view of a bicycle with our improved brake attachment thereon; Fig. 2, an enlarged perspective view of the front fork and handles, showing the lever and cable attachment; Fig. 3, a side view, partly in section, of the rear fork, showing the brake and cable connection. Fig. 4 is a perspective view of the hind wheels and metal shield; Fig. 5, a perspective view with the shield removed, exposing the cable and grooved wheels; and Fig. 6, an enlarged plan view of a modification.

This invention relates to improvements in the application of brakes to the steering-wheel; and it consists in the method and means by which the brake is operated and the construction and combination of the several parts.

In the accompanying drawings, A represents the front fork, B the rear fork, C the tubular backbone, D the front wheel, and E' the hind wheel, of an ordinary bicycle. The usual handle, E, on the front fork has an ordinary brake-lever, F, which is curved downwardly at its inner end, and is formed with a hook, H. Around the upper part of the fork A we provide a yoke-swivel, I, the rear end, J, connecting with the cable K, passing rearwardly backward from the tubular backbone C. For convenience the cable is formed branching at its forward end J, so as to connect with the two ends J, to swivel I, though we prefer the split cable branching as shown in the drawings. The cable K extends rearwardly and downwardly through the backbone C, where it connects with the rear end of the brake-lever L.

The side back lever is pivoted at the forward side of the backbone C, and forwardly therefrom to the back part of the lever L, so as to come in contact with periphery of the hind wheel when the rear end of the said lever L is raised. As this lever L projects rearwardly from the backbone C, it is necessary to provide a shield, M. (Shown in Fig. 4.) This shield is attached to the backbone C by means of clamps N, and acts in the double capacity of protecting the said lever and at the same time to remove the dirt from the wheel in its rotation. The inner side of the said shield M is provided on its inner side with a small grooved pulley, O, to receive therein the lower end of the cable K, to prevent it coming in contact with the upper part, P, of the backbone. The use of this pulley is, however, optional, and by the upward extension of the slot enables the pulley to be dispensed with. The openings of the upper end of the backbone C are designed to be bushed with Babbitt or other soft metal, to prevent the friction of the cable. The cable is designed to be covered with rubber within the tubular backbone, so as to prevent the friction and rattling of the said cable.

Fig. 6 represents a modification of our device wherein we dispense with the link I, and simply form the upper end of the cable K with branching parts Q, which are designed to pass forwardly on each side of the fork A and connect with the transverse swivel R upon the downturned part G of the brake-lever F. This, as will be readily noticed, somewhat simplifies the mechanism, and at the same time renders it fully as efficient.

What we claim is—

1. In a bicycle, and in combination with the backbone, the shield M, near its lower end, having the grooved pulley O attached thereto, the brake-lever L, and cord K, substantially as and for the purposes specified.

2. In combination with the steering-wheel and the backbone, the brake-lever L, the cord K, and grooved wheel O, substantially as and for the purpose specified.

3. In combination with the backbone and the clamp N, the shield M, secured by said clamp upon the backbone, and provided with the pulley O and the brake-lever L and cord K, substantially as described.

4. In combination with fork A, the handle E, and the brake-lever F, downwardly-curved at G, and having the hook H at its end, the yoke-swivel I, the cord or cable K, the backbone C, the steering-wheel, and the lever L, substantially as and for the purposes specified.

In testimony that we claim the foregoing we have hereunto set our hands, this 4th day of September, 1886, in the presence of witnesses.

WILLIAM L. HAZEN.
GEORGE H. HILDRETH.

Witnesses:
W. J. STURTZ,
C. D. ZERBE.